Patented June 20, 1950

2,512,490

UNITED STATES PATENT OFFICE 2,512,490

METHOD OF MAKING RETRACTILE ARTICLES FROM SOLUTIONS OF CELLULOSE TRIACETATE IN A SOLVENT COMPRISING GLYCOL FORMAL

Nicolas Drisch and Rene Fays, Paris, France, assignors, by mesne assignments, to Societe Novacel, Paris, France, a corporation of France No Drawing. Application April 8, 1947, Serial No. 740,270. In France November 8, 1944

Section 1, Public Law 690, August 8, 1946
Patent expires November 8, 1964

1 Claim. (Cl. 18—58)

This invention relates to retractile articles, such as caps, bands or the like, and more particularly to a method of making retractile articles.

United States Patent 2,320,381 discloses a procedure for making retractile articles, such as caps, bands, etc., of cellulose derivatives having the property of shrinking upon conversion from a wet or gel state to the dry state and firmly adhering to the article on which they have been applied. According to such patent, the retractile article formed of a cellulose derivative insoluble in water is impregnated in the gel state with a plasticizer which is a swelling agent or solvent for the cellulose derivative, miscible with water in large proportions, and sufficiently volatile to be largely eliminated during the drying of said article when it is positioned in place in the ultimate use thereof. According to such patent, the plasticizer can be a derivative of glycol having the following general formula:

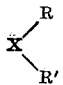

wherein:

X is a radical of glycol;
R is a radical of a lower fatty acid or a halogen,
R' is a hydroxyl group, a radical of a lower fatty acid, or an alkoxyl radical containing 1 to 2 atoms, or a derivative of glycerol having the following general formula:

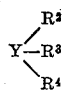

wherein:

Y is a radical of glycerol;
R² is a radical of a lower fatty acid or a halogen;
R³ is a hydroxyl group, a radical of a lower fatty acid, or an alkoxyl radical containing 1 to 2 atoms;
R⁴ is a hydroxyl group, a radical of a lower fatty acid, or an alkoxyl radical containing 1 to 2 atoms.

United States Patent 2,318,796 discloses a procedure for producing retractile articles, such as caps and bands, wherein a solution of triacetate of cellulose in a mixture of monochlorhydrin of glycol, water and triacetin is molded onto a glass mold and then coagulated in a coagulating bath containing a dilute aqueous solution of the same cellulose acetate solvent used in the molding composition.

An object of this invention is to provide a new and improved method of making retractile articles, such as caps and bands, having a sufficient degree of elasticity so that they can be stretched and disposed in position on the article and immediately adhere sufficiently tightly and conform to the article to which they are applied to permit immediate handling thereof.

Another object of this invention is to provide a method of producing retractile articles, such as caps and bands, from a solution of cellulose acetate (triacetate) in glycol formal.

Other and additional objects will become apparent hereinafter.

The objects of the invention are accomplished, in general, by coagulating a solution of cellulose acetate (triacetate) dissolved in glycol formal formed in the desired shape on a mold with a dilute aqueous glycol formal solution, and thereafter impregnating the resulting cellulose acetate article, while in the gel state, with a plasticizer which is a swelling agent or solvent for the cellulose derivative, miscible with water in large proportions, and sufficiently volatile to be largely eliminated during the drying of the article when it is positioned in place in the ultimate use thereof.

In another embodiment of the invention, the plasticizer is incorporated in the coagulating bath.

The details and manner of practicing the invention will become apparent by reference to the following specific examples; it being understood that these examples are merely illustrative embodiments of the invention and that the scope of the invention is not limited thereto. Throughout the examples, the proportions are parts by weight.

Example I 12.5 parts of cellulose triacetate (62% acetic acid) are dissolved at 40° to 50° C. in a mixture of 74 to 76 parts of glycol formal and 6 to 4 parts of water. To the resulting solution, 3 parts of phthalate of methyl glycol and 3 parts of Plastomoll (p-toluenesulphamide or a derivative are added. Appropriate glass molds are immersed in this solution at 20° C. and withdrawn. After draining, the molds together with the adhering solution are immersed at 20° C. in a coagulating bath consisting of a 14% aqueous solution of glycol formal. After 10 to 15 minutes, the molds are withdrawn from the coagulating bath and then dipped into a 12% aqueous solution of diacetate of glycol at room temperature (20° C.) in order to impart the plasticity and elasticity. The resulting caps are then stripped from the mold, cut to the desired lengths, and packaged while in the gel condition in impermeable containers. The caps can be stretched to from 60% to 70% of their diameters.

*Example II*

A solution of triacetate of cellulose, as set forth in Example I but also containing 2 to 5 parts of glycol diacetate as a supplement, is prepared as set forth in Example I. The solution is molded as set forth in Example I and then, after draining, is immersed in an aqueous coagulating bath at 20° C. and containing 10% of glycol formal and 12% of diacetate of glycol. The caps, upon stripping from the mold, are cut to the desired lengths and packed while in the gel condition in impermeable containers.

The method can be carried out in a continuous manner. In such an embodiment, the molds are carried by movable carriers which are successively shifted and immersed in the respective solutions. The carriers also can be slowly moved during the impregnating treatment of Example I or the simultaneous coagulation and impregnation of Example II in a direction opposite to the flow of the respective solutions.

If desired, coloring agents, fillers, etc., can be incorporated in the molding solution.

The molding solution of cellulose triacetate contains a relatively high concentration of glycol formal and a low concentration of water. In general, the relative concentration of glycol formal and water constituting the solvent of the cellulose acetate should be such as to produce limpid stable solutions of cellulose triacetate.

The coagulating solution is a dilute aqueous solution of glycol formal and, in general, contains not more than 15% of glycol formal. With such coagulating bath composition, the coagulated article is not distorted and does not show leakage. As shown by the examples, the cellulose triacetate can be either impregnated with the plasticizer after coagulation or simultaneous with coagulation.

Though in the examples diacetate of glycol is disclosed as the plasticizer, it is to be understood that the invention is not restricted thereto. Any glycol or glycerol derivatives, such as set forth in United States Patent 2,320,381, and particularly monoformate of glycol, monoacetate of glycol, diacetate of glycol, glycerol monoacetate, glycerol diacetate and glycerol triacetate, singly or in combination with each other, can be used. By appropriate choice of proportions, a greater or lesser quantity of the plasticizer can be incorporated in the gel article.

The invention provides a method of producing retractile articles, such as caps and bands, from a solution of cellulose triacetate in glycol formal The use of glycol formal has the following advantages over the use of monochlorhydrins:

(1) Ease in recovering of the solvent due to the fact that the boiling point thereof is 75° C., which is lower than water and considerably lower than that of the elasticity-imparting agents;

(2) Less danger of the material being corroded by HCl formed by slow hydrolysis of chlorhydrin;

(3) Eliminates the use of highly toxic chlorhydrin;

(4) Permits shortening of the coagulation time which, although progressive (contrary to the procedure manufacturing threads and films with this solvent), is nevertheless accelerated without detriment to the quality of the caps or bands.

Since it is obvious that various changes and modifications may be made in the above description without departing from the nature or spirit thereof, this invention is not restricted thereto except as set forth in the appended claim.

We claim:

A method of producing retractile articles, such as caps and bands, having sufficient plasticity and extensibility in the gel state to permit stretching thereof, which comprises molding a solution of cellulose triacetate dissolved in a mixture of 74 to 76 parts of glycol formal and 6 to 4 parts of water in the desired shape and form, and coagulating said solution while in said shape and form with an aqueous solution containing 14% glycol formal.

NICOLAS DRISCH.
RENE FAYS.

REFERENCES CITED

The following references are of record in the file of this patent:

UNITED STATES PATENTS

| Number | Name | Date |
|---|---|---|
| 2,318,796 | Picard et al. | May 11, 1943 |

OTHER REFERENCES

Condensed Chemical Dictionary, 3rd ed., Reinhold Publishing Corp., New York, 1942, page 250.